(12) United States Patent
Watanabe et al.

(10) Patent No.: US 6,480,461 B1
(45) Date of Patent: Nov. 12, 2002

(54) RECORDING MEDIUM CARTRIDGE

(75) Inventors: Taku Watanabe; Takeshi Koizumi, both of Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/530,281

(22) PCT Filed: Aug. 31, 1999

(86) PCT No.: PCT/JP99/04705

§ 371 (c)(1),
(2), (4) Date: Oct. 10, 2000

(87) PCT Pub. No.: WO00/13182

PCT Pub. Date: Mar. 9, 2000

(30) Foreign Application Priority Data

Aug. 31, 1998 (JP) .............................. 10-245824
Jun. 11, 1999 (JP) .............................. 11-165687

(51) Int. Cl.$^7$ ............................................. G11B 23/03
(52) U.S. Cl. ........................................ 369/263; 369/291

(58) Field of Search ............................... 360/132, 133; 369/258, 263, 271, 289, 291; 242/341, 347; 206/307, 308.1, 308.3, 312, 313, 387.1

(56) References Cited

U.S. PATENT DOCUMENTS 6,147,836 A * 11/2000 Odagiri et al. .............. 360/132

FOREIGN PATENT DOCUMENTS

| JP | 0016775 | 1/1986 | |
|---|---|---|---|
| JP | 04-318379 | * 11/1992 | ................. 360/132 |
| JP | 0129280 | 5/2000 | |

* cited by examiner

Primary Examiner—David L. Ometz
(74) Attorney, Agent, or Firm—Jay H. Maioli

(57) ABSTRACT

A recording medium cartridge housing a disc wherein the vibration of the disc can be reduced by printing a vibration isolating ink layer containing acrylic particles and having a projecting and depressing surface on a portion including at least a support area of an upper half of the cartridge housing. The isolating ink layer acts by absorbing the vibration transmitted to the cartridge housing.

5 Claims, 15 Drawing Sheets

RECORDING MEDIUM CARTRIDGE

TECHNICAL FIELD

The present invention relates to a cartridge of an optical disk or a magneto-optical disc and the like, for instance, by which recording and/or reproducing of recording information such as musical signals or graphic signals and the like can be processed, and more particularly, according to the present invention, the signals can be reproduced with fidelity by means of printing a vibration isolating ink layer on an upper half of a cartridge, and thus the vibration transmitted from a cartridge housing is reduced.

BACKGROUND ART

Until now, the disc cartridge with disc recording medium has been widely spread as the cartridge of this kind. Such the disc cartridge is, as shown in FIG. 17, a cartridge housing 3 constructed by combining an upper half 1 with a lower half 2, and an optical disc or a magneto-optical disc (hereafter, called as disc 4) is rotatably accommodated in the cartridge housing 3. The cartridge housing 3 is provided with a shutter 5 which can be opened/shut.

When the disc cartridge described above is attached to the deck of a recording and/or reproducing apparatus, the shutter 5 is opened, and together with this action, reference holes not shown of the lower half 2 are engaged with a pair of reference pins 7 of a reference table 6 on the deck side, and the reverse surface of the lower half 2 is received by a pair of receive parts 8 and then the disc cartridge is horizontally supported. And also, the disc cartridge is supported by being pressed by a pair of press-springs 9 from the upper surface of the upper half 1. Under the condition of the disc cartridge being supported, the disc 4 is chucked by a disc table, and is driven into rotation by a spindle motor. And then, recording and/or reproducing operations take place by an optical head/magnetic head opposing the disc, through a window aperture with the opened shutter 5.

By the way, with regard to the disc cartridge during performing the recording and/or reproducing operations, the vibrating motion accompanied by the high speed rotation and the like by the spindle motor is transmitted to the cartridge housing 3, from the reference pins 7 and the receive parts 8 of the reference table 6. At the same time, it is also transmitted to the cartridge housing 3 from the press-springs 9. The vibration of the cartridge housing 3 makes atmosphere in the cartridge housing 3 vibrate, and gives not a little influence on the rotating disc 4, and thus, the face vibration of the disc 4 will occur. And therefore, when the disc 4 vibrates, the signals read by the optical head are also varied, and the matter will give the influence on the reproduced waves of the musical signals, too, and as the result, the problem occurs that the reproduction with fidelity can not be carried out.

The present invention was implemented to resolve the problem described above, and its object is to reduce the vibration of the cartridge housing, and thereby, to obtain a cartridge which can reproduce with fidelity by suppressing the vibration of the disc.

DISCLOSURE OF THE INVENTION

According to the recording medium cartridge of the present invention, the vibration isolating ink layer containing resin system particles and having a projecting and depressing surface is formed on the cartridge housing between the supporting part and/or holding part of the cartridge to the receiving space opposing the outer peripheral part, in order to attain the object described above.

With regard to the recording medium cartridge described above, the vibration of the cartridge housing is transmitted from the supporting part through a reference table of a deck by which the lower half is supported as well as from the press-material by which the upper half is supported, and it is further spread toward the peripheral part thereof. Therefore, as for a range of the vibration isolating ink layer to be formed on the cartridge housing, it is formed from the supporting part or the holding part of the cartridge to the accommodating space opposing the recording medium, and thus, the vibration based displacement generated at a portion in contact with the supporting part of the cartridge housing and at a portion in contact with the press-material can be absorbed and reduced by the vibration isolating ink layer, and then the vibration of the recording medium can be suppressed to the minimum.

A typical example of the vibration isolating ink layer formed on the cartridge housing is printed on the portion including a support area of the upper half. According to this, by printing the vibration isolating ink layer on the upper half, the vibration of the cartridge housing can be effectively suppressed, and thus, the vibration of the cartridge housing exerting influence on the recording medium can be reduced.

And besides, another example of the vibration isolating ink layer formed on the cartridge housing is what is printed on the outer peripheral part of the upper half surface corresponding to the recording medium of the cartridge housing. In this matter, the vibration being transmitted to the cartridge housing is transmitted from the outer peripheral part of the cartridge housing toward the central portion thereof, and therefore, the vibration can be effectively reduced, by printing the vibration isolating ink layer on the outer peripheral part of the cartridge housing.

BEST MODE FOR CARRYING OUT THE INVENTION

Hereinafter, two embodiments of a disc cartridge according to the present invention will be described by citing a disc cartridge for an MD (mini disc) as an example with reference to the drawings.

First Embodiment

Figure 1:
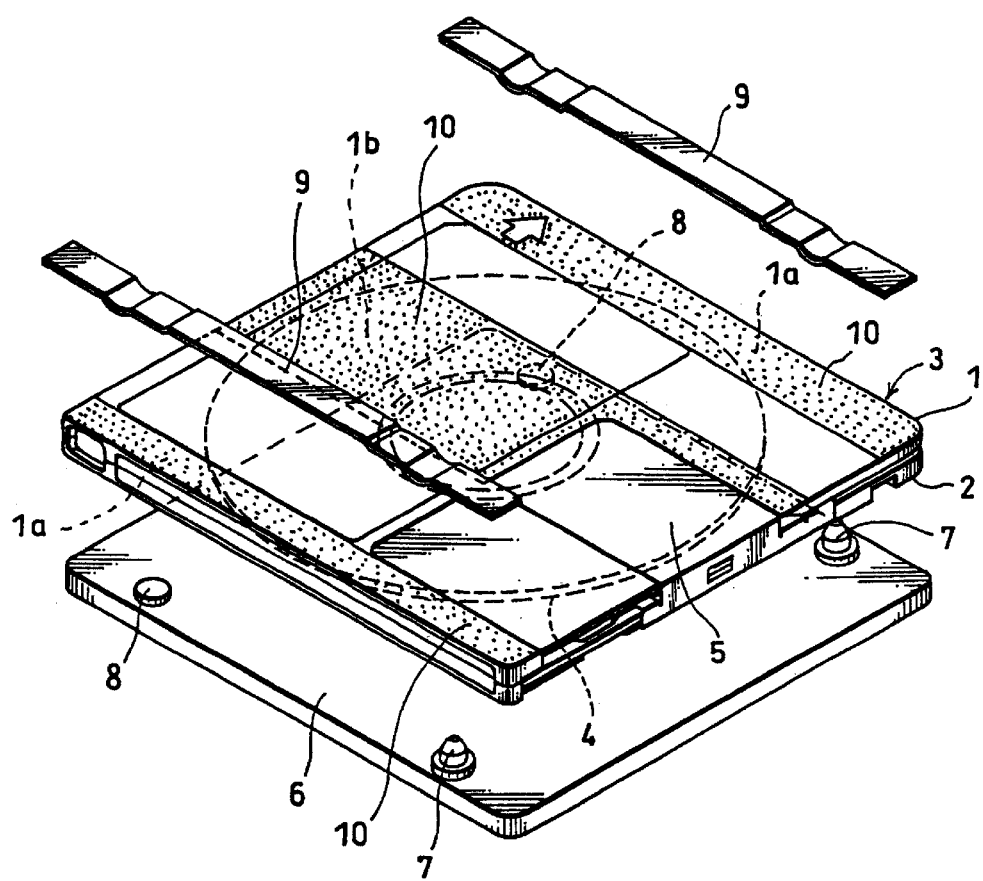
FIG. 1 is a perspective view showing a separated condition of a disc cartridge, a deck and a press-spring based on a first embodiment according to the present invention.
Figure 17:
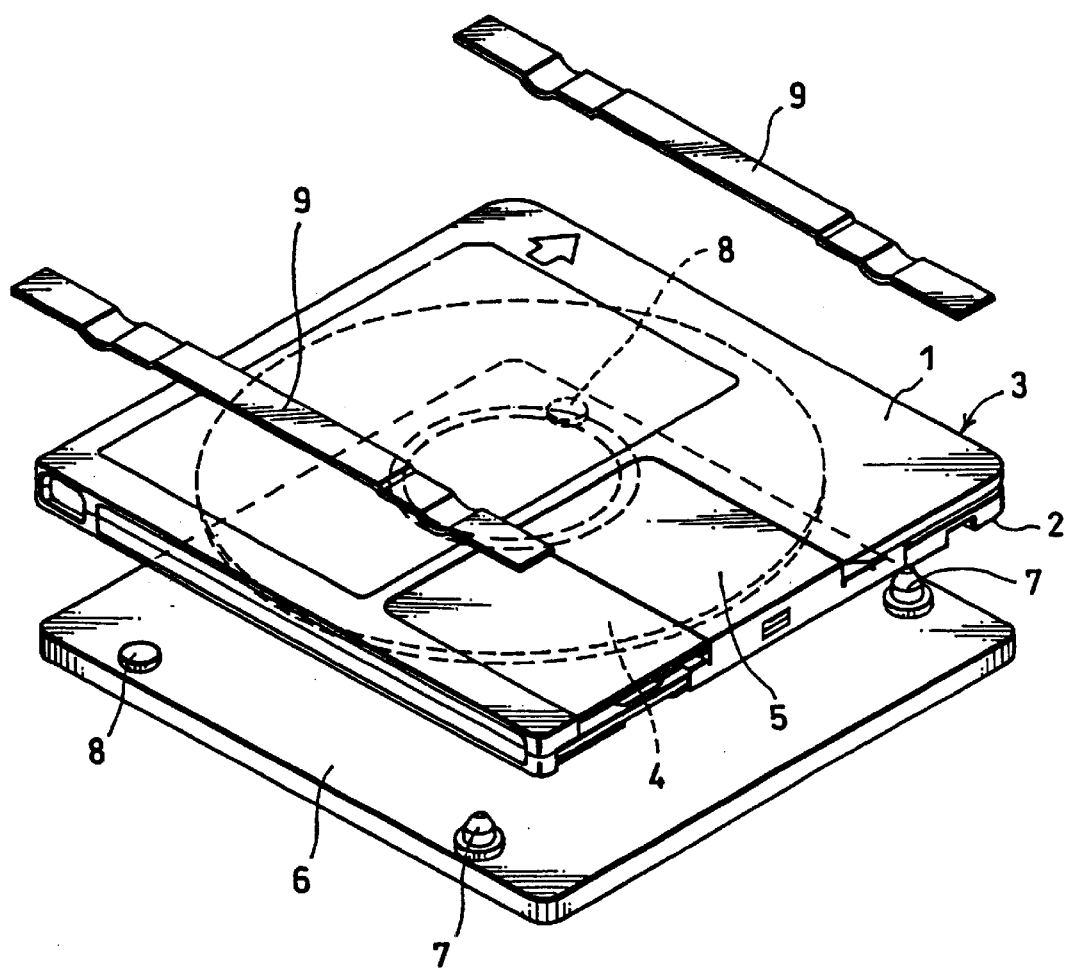
FIG. 17 is a perspective view showing the separated condition of a conventional disc cartridge, a deck and a press-spring.

FIG. 1 is a perspective view showing a disc cartridge, a reference table on a deck side and a press-spring supporting an upper half, and a description will be made by attaching same signs to constituting components similar to those in the conventional example shown in FIG. 17.

A cartridge housing 3 is constituted by combining an upper half 1 with a lower half 2 into one body, and an optical disc or a magneto-optical disc (hereafter, called disc 4) is rotatably accommodated in this cartridge housing 3. The cartridge housing 3 is provided with a shutter 5 which can be opened/shut.

When the disc cartridge described above is attached to the deck of the recording and/or reproducing apparatus, in conjunction of an action of the shutter 5 being released, reference holes not shown of the lower half 2 are engaged with a pair of reference pins 7 of a reference table 6 on the deck side, and a reverse surface of the lower half 2 is received by a pair of receive part 8 and then the disc cartridge is horizontally supported. And also, an upper surface of the upper half 1 is supported by a pair of press-springs 9 and the disc cartridge is held. Under the condition of the disc cartridge being held, the disc 4 is chucked by a disc table, and is driven into rotation by a spindle motor. And then, the recording and/or reproducing operations are performed by the optical head/magnetic head opposing the disc, through the opened window aperture of the shutter 5.

By the way, a vibration isolating ink layer 10 is printed on a surface of the upper half 1, in order to reduce the vibration transmitted from the deck side to the cartridge housing 3. In the present example, this vibration isolating ink layer 10 is printed on support area portions 1a of the upper half 1 which are supported by the press-springs 9 described above, and on a central portion 1b of the upper half 1. In this example, the ratio at which the vibration isolating ink layer 10 is printed on the upper half 1 is made about 50%.

Now, the vibration isolating ink layer 10 will be described in detail.

Ink components of the vibration isolating ink layer are:

black ink: 1 weight part, medium: 1 weight part, mat agent consisting of inorganic filler: 0.02 to 0.1 weight part, and acrylic particles with 10 to 30 $\mu$m in diameter: 0.05 to 0.5 weight part.

The above are mixed in a solvent at the above ratios.

As a procedure for mixing the above-mentioned ink components, first mix acrylic particles with the medium and make a film of acrylic system resin on the surface of the acrylic particle and then, add matte agent. After that, by mixing a black ink into the above-mentioned mixture, a vibration isolating ink having uniform adhesion and an alcohol-resistant nature is made.

As for the method for printing the vibration isolating ink, an ordinary silk printing machine is used, by which the vibration isolating ink is printed into a silk plate of about 230 mesh, and can be printed on the upper half 1.

Figure 2:
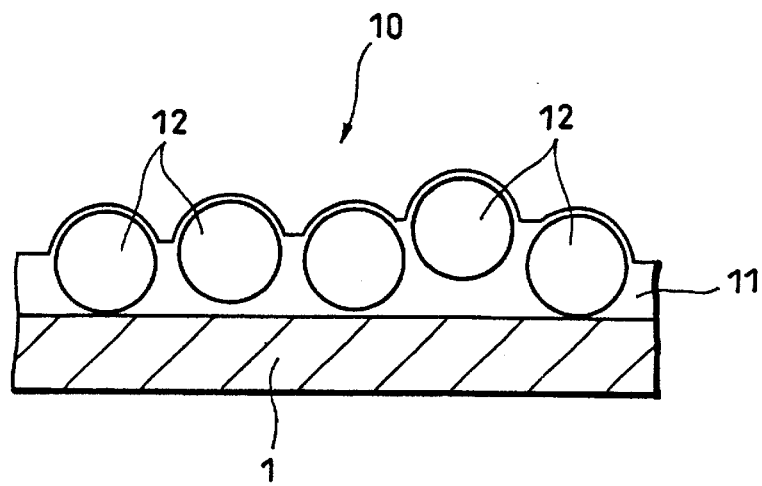
FIG. 2 is similarly, an enlarged view showing a printed condition of the vibration isolating ink layer.

An enlarged view of a state in which the vibration isolating ink is printed is shown in FIG. 2.

According to this, on the upper half 1 is formed the vibration isolating ink layer 10 whose printed surface has a so-called crimp pattern, in which projections and depressions due to the acrylic particles occur on the surface of an ink base 11 with 10~20 $\mu$m in thickness.

And besides, when the weight part of the acrylic particles 12 exceeds 0.5, since the adhesive character of the printing on the upper half 1 reduces, it is necessary that the weight part does not exceed 0.5.

Also, adding 0.02~0.1 weight part to the matte agent adjusts the gloss of the printed surface and makes scratches thereof inconspicuous by dint of reflection of light. In addition, the hardness of matte agent itself being high, there is presented a counter measure for scratches and so on. However, when the matte agent exceeds 0.1 in weight part, deterioration in adhesion of printing is triggered and so it is necessary to have the weight part not exceed 0.1.

Also, by mixing the same amount of the medium with that of the black ink which contains pigment, the hardness of the whole ink can be improved and as a result, the printed ink layer can be prevented from being damaged.

According to the embodiment, the black ink is used as an ingredient of the vibration isolating ink layer for forming the ink base 11, but another type of ink can also be used, if the ink uses acrylic resin and the like as binders, and contains dilution solvent, pigment, and promotor.

According to the present invention, by printing the vibration isolating ink layer 10 described above on the upper half 1, the vibration transmitted from the deck side to the cartridge housing 3 can be reduced by the projecting and depressing acrylic particles 12. The mechanism of reducing the vibration is such that when the vibration is transmitted to the vibration isolating ink layer 10, the acrylic particles 12 vibrate, thereby converting vibration energy into thermal energy, and the vibration is resultantly reduced. Namely, since the vibration of the cartridge housing 3 is reduced, the atmosphere vibration in the cartridge housing 3 is not generated, and then, the face vibration of the disc 4 can be suppressed to the minimum. As a result, the reading of signals by the optical head of the disc can be certainly performed, and for example, the reproduced waves of musical signals and the like can be reproduced with fidelity.

Also, since the vibration isolating ink layer 10 printed on the upper half 1 can obtain high hardness as well as high adhesion, when the upper half 1 and the lower half 2 are subjected to ultrasonic-welding, it never peels off as well as is damaged.

Here, the inventor of the present invention has proved by experiment that the vibration which the cartridge housing is subjected to can be reduced by printing the vibration isolating layer on the upper half 1.

Figure 3:
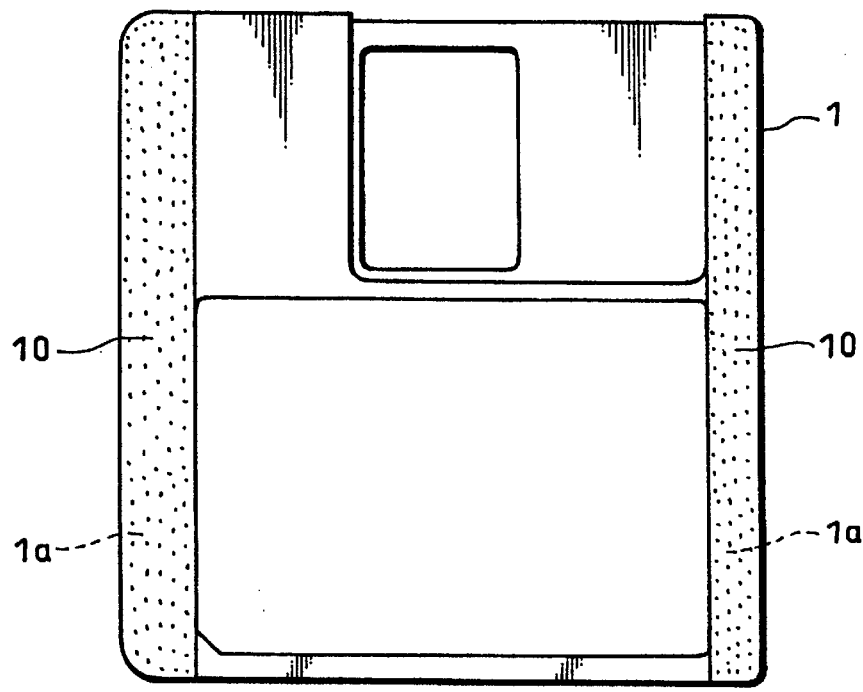
FIG. 3 is similarly, a plan view showing the vibration isolating ink layer being printed on a support area of the upper half.
Figure 4:
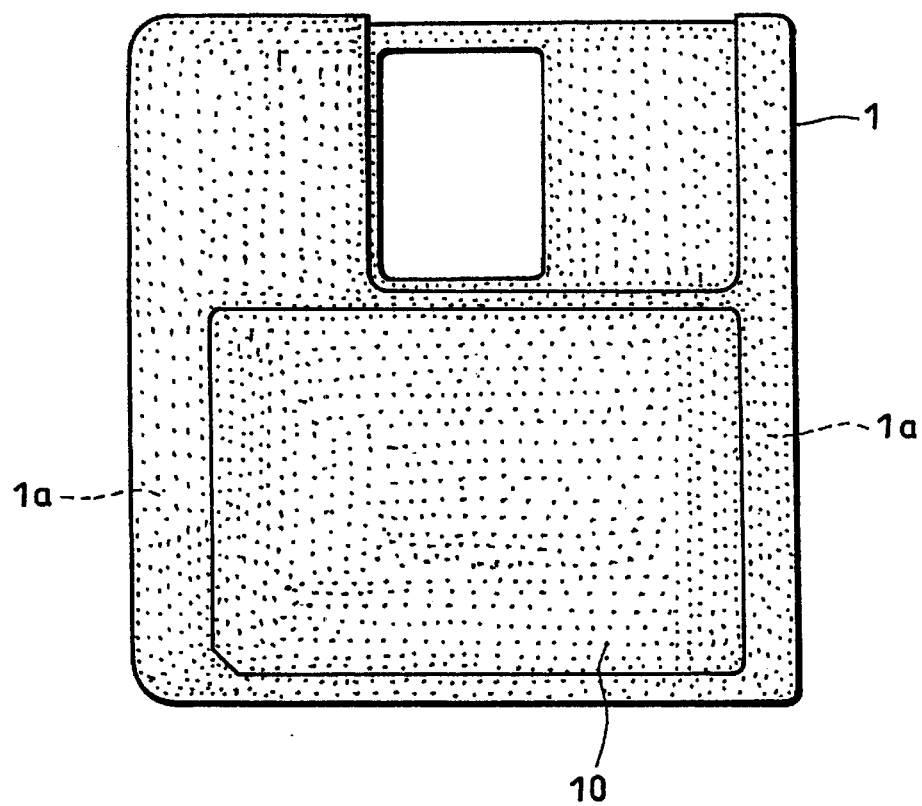
FIG. 4 is similarly, a plan view showing the vibration isolating ink layer being printed on the whole surface of the upper half.
Figure 5:
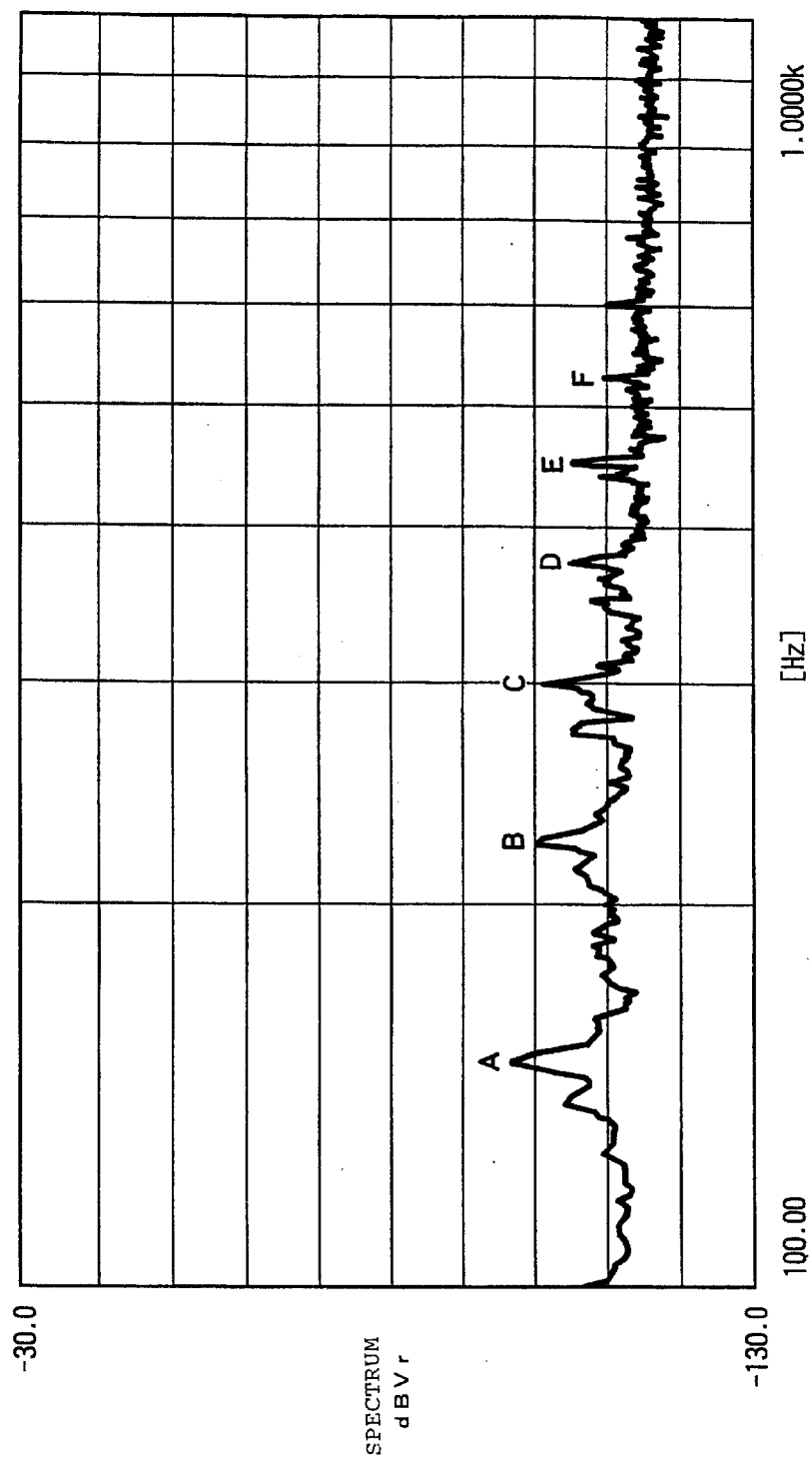
FIG. 5 is analysis data on vibration generated in the conventional cartridge housing.
Figure 6:
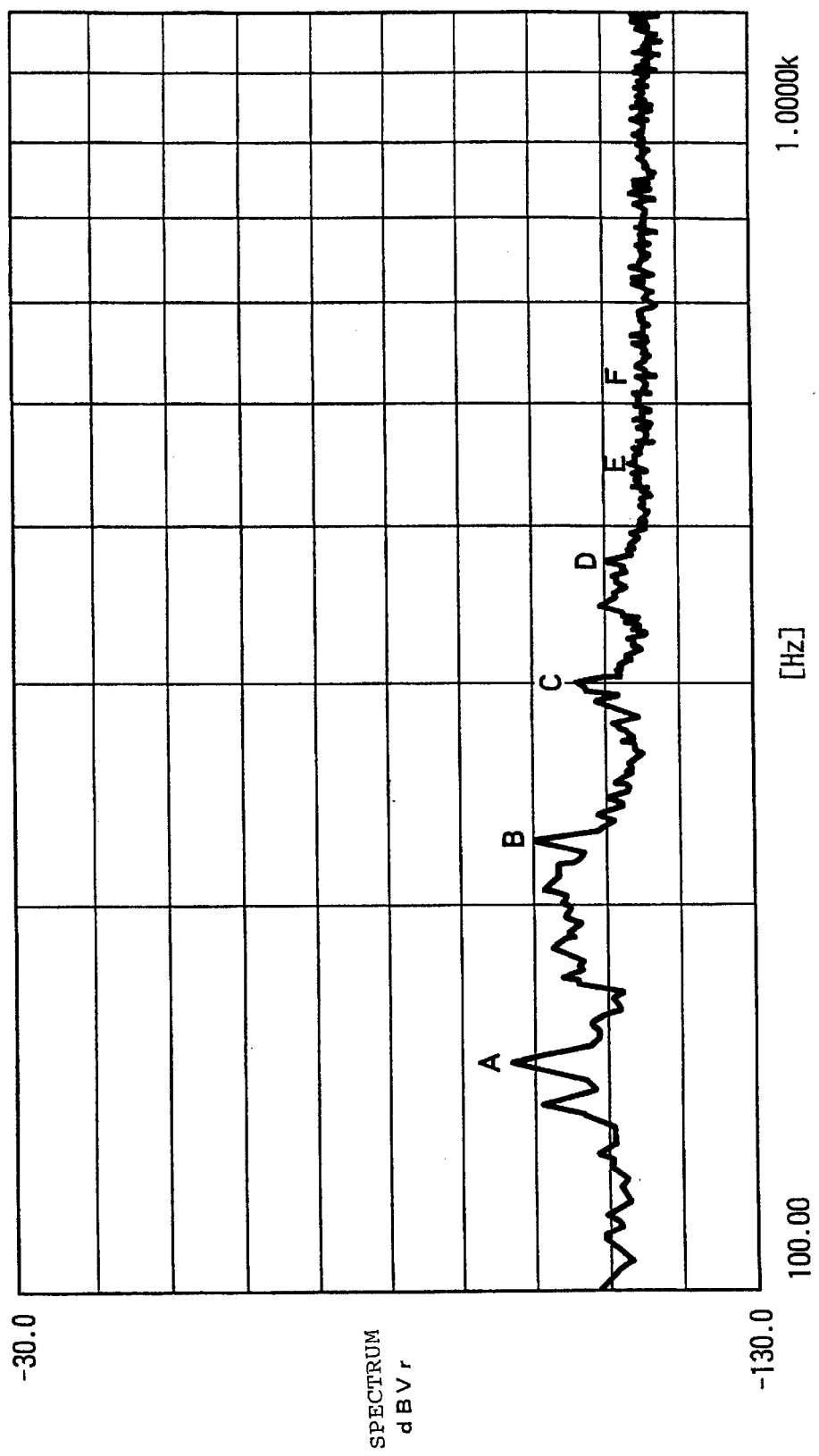
FIG. 6 is analysis data on vibration generated in the cartridge housing according to the present invention.

As for the experiment method, by using a laser Doppler vibrometer, analysis data by a spectrum analyzer on measurements of the vibrations at a central portion of the upper half 1 in the cases of a conventional cartridge as well as a cartridge where the vibration preventing ink layer 10 is printed on 50 percent of the surface of the upper half as shown in FIG. 1 when an MD disc cartridge is being reproduced are respectively shown in FIG. 5 and FIG. 6. Also, numerical values (dBVr) (numerical values respectively at peak points of A, B, C, D, E, F in FIG. 5 and FIG. 6) relative to several representative frequencies at this time are shown in table 1. Meanwhile, numerical values (dBVr) in the case where the vibration preventing ink layer is printed only on the support areas 1a of the upper half 1 as shown in FIG. 3 and in the case where it is printed on the whole surface of the upper half 1 are shown in the table 1.

TABLE 1

| representative frequencies | 150 Hz | 225 Hz | 300 Hz | 373.75 Hz | 447.5 Hz | 522.5 Hz |
|---|---|---|---|---|---|---|
| conventional cartridge | −96.78 | −101.14 | −101.72 | −105.09 | −106.57 | −109.58 |
| print ink only on support | −96.46 | −100.12 | −104.89 | −106.46 | −110.13 | −110.26 |
| print ink 50% | −97.01 | −100.34 | −106.75 | −110.87 | −113.74 | −117.52 |
| print ink on the whole surface | −97.31 | −100.22 | −107.01 | −110.97 | −113.68 | −118.60 |

In this manner, it is apparent from the result of the experiment that the cartridge housing of the present invention as compared with the conventional cartridge housing has its vibrations alleviated. Specifically, it has come to be known that the vibration can extremely effectively be suppressed by printing the vibration isolating ink layer 10 on the whole surface of the upper half 1.

Therefore, according to the present invention, an excellent result is obtained by painting the vibration isolating ink layer on the portions corresponding to the support areas 1a and 1a of the upper half 1 and further, by printing it on equal to or more than 10~20% of the surface of the upper half 1.

Figure 7:
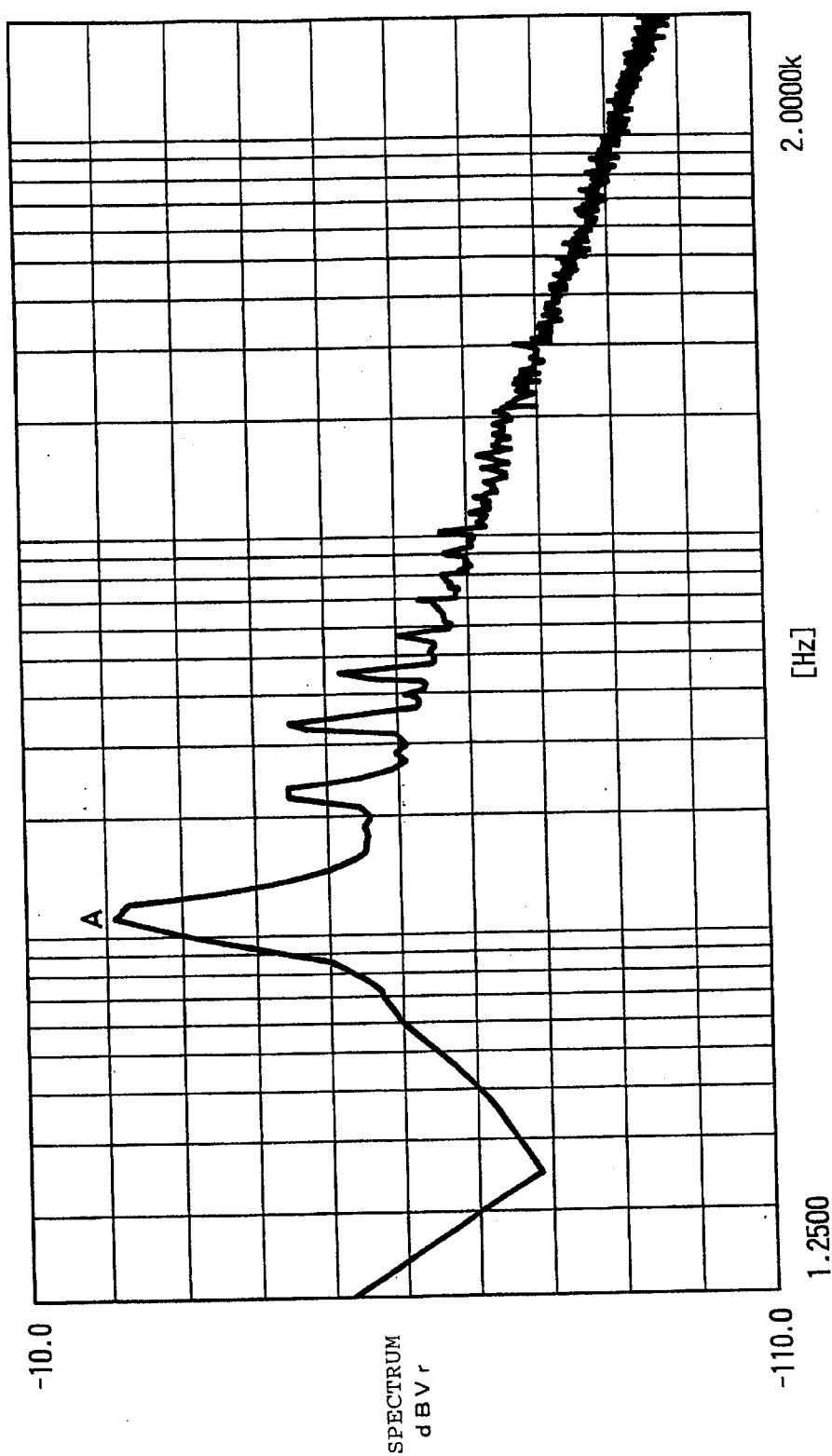
FIG. 7 is analysis data on vibration of a disc in the conventional cartridge housing.
Figure 8:
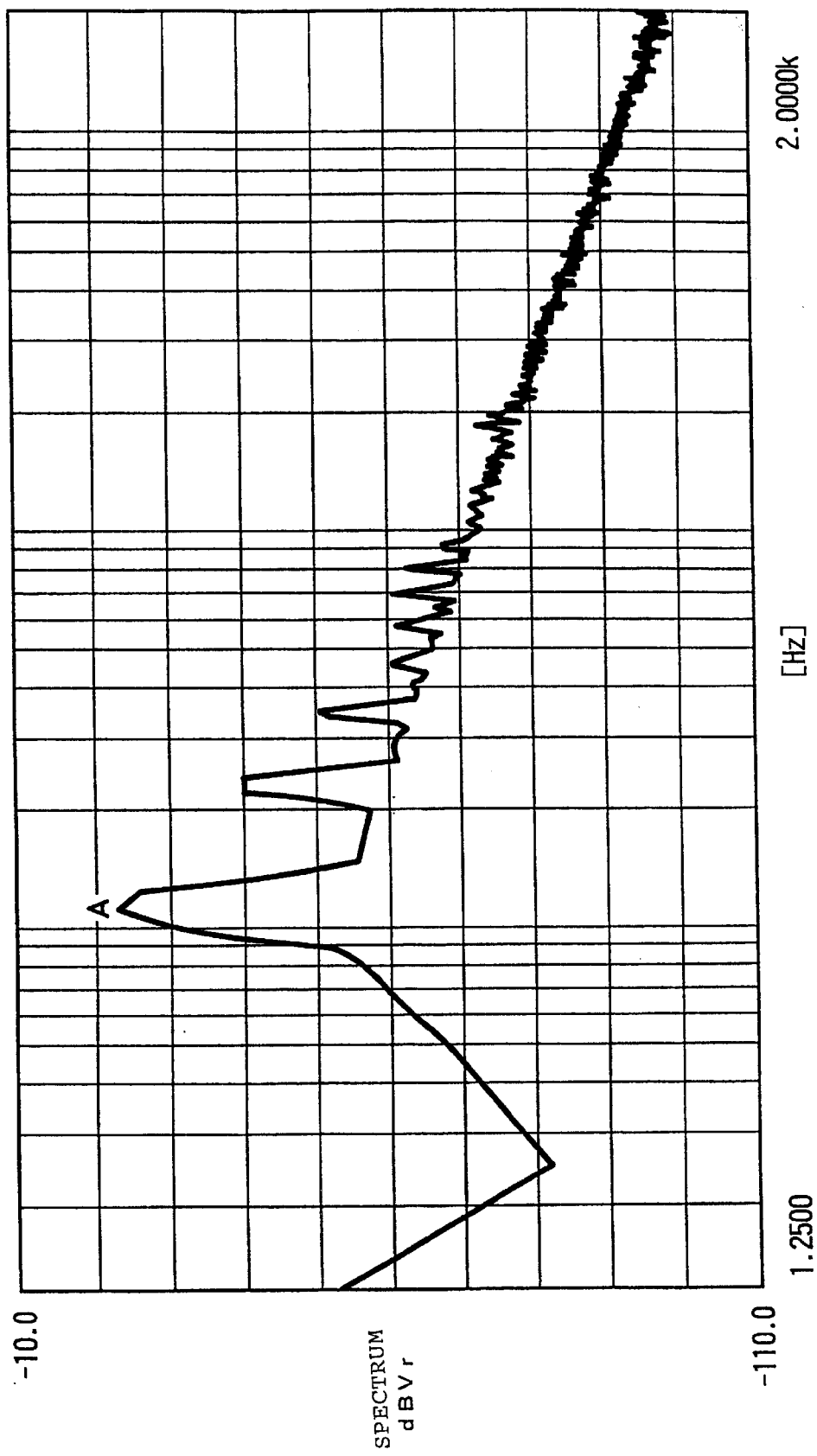
FIG. 8 is analysis data on vibration of a disc in the cartridge housing according to the present invention.

Also, analysis data by a spectrum analyzer on measurements of the vibrations of a disc in the conventional disc cartridge as well as of a disc in the disc cartridge of the present invention in which the vibrations isolating ink layer 10 is printed on 50 per cent of the surface of the upper half as shown in FIG. 1 by a measuring method using the above-mentioned same laser Doppler vibrometer, are shown in FIG. 7 and FIG. 8. Meanwhile, numerical values (dBvr) (numerical value at a peak point A in FIG. 7 and FIG. 8) relative to the representative frequency (11.25 Hz) is shown in the table 2.

TABLE 2

| representative frequency | 11.25 Hz |
|---|---|
| the conventional cartridge | −20.87 |
| print ink 50% | −22.95 |

In this manner, it is apparent from the result of the experiment that the vibration of the disc is alleviated when the cartridge housing of the present invention is used in stead of the conventional cartridge housing.

Also, the reproducing waveforms of the disc were measured by using the spectrum analyzer. As a measuring method, a digital recording is carried out from a CD player to a deck and reproduction is inputted in the spectrum analyzer and then, a reproduction level is ascertained.

Numerical values (dB) of analysis data on disc reproducing waveforms of the conventional disc cartridge as well as of the disc cartridge of the present invention, in which the vibration isolating ink layer 10 is printed on 50% of the surface of the upper half as shown in FIG. 1 when the representative frequency is 12.75 KHz will be shown in the Table 3. Meanwhile, in order to improve a characteristic of a high-pitched tone of the disc, a high frequency range on the high-pitched tone side is selected. That is the reason why the representative frequency is made 12.7 KHz.

TABLE 3

| representative frequency | 12.7 KHz |
|---|---|
| reproducing wave pattern | −44.65 |
| the conventional cartridge | −46.41 |
| print ink 50% | −45.01 |

In this manner, it is apparent from the result of the experiment that the reproducing waveform is improved even in the case in which the cartridge housing of the present invention is used in stead of the conventional cartridge housing.

While there was disclosed the case that the vibration isolating ink layer 10 was printed on the front surface side of the upper 1, even if the printing is performed on the reverse surface side of the upper 1, the vibration of the cartridge housing can be reduced as in the case described above. Also, if the vibration isolating ink layer 10 is printed on both the front side surface and reverse side surface, the vibration of the cartridge housing can be further reduced.

Besides, the vibration isolating ink layer may also be formed on the lower half 2 as well as on the upper half 1, or by forming the ink layer on either side of the front surface and the reverse surface of both the upper and lower halves 1, 2 or on both of the surfaces, the suppressive action against the vibration of the cartridge housing can be improved. In this case, as for a printing range of the vibration isolating ink layer 10, if it is formed in the part of the cartridge housing 3 from the position of the press-spring 9 to the accommodating space opposed by an outer peripheral part of a disc in a case of the upper half 1, and if it is at least formed in the part of the cartridge housing 3 from the position of the reference pin 7 and the receive part 8 to the accommodating space opposed by the outer peripheral part of the disc in a case of the lower half 2, the suppressing action against the vibration of the cartridge housing can be obtained.

Second Embodiment

Figure 9:
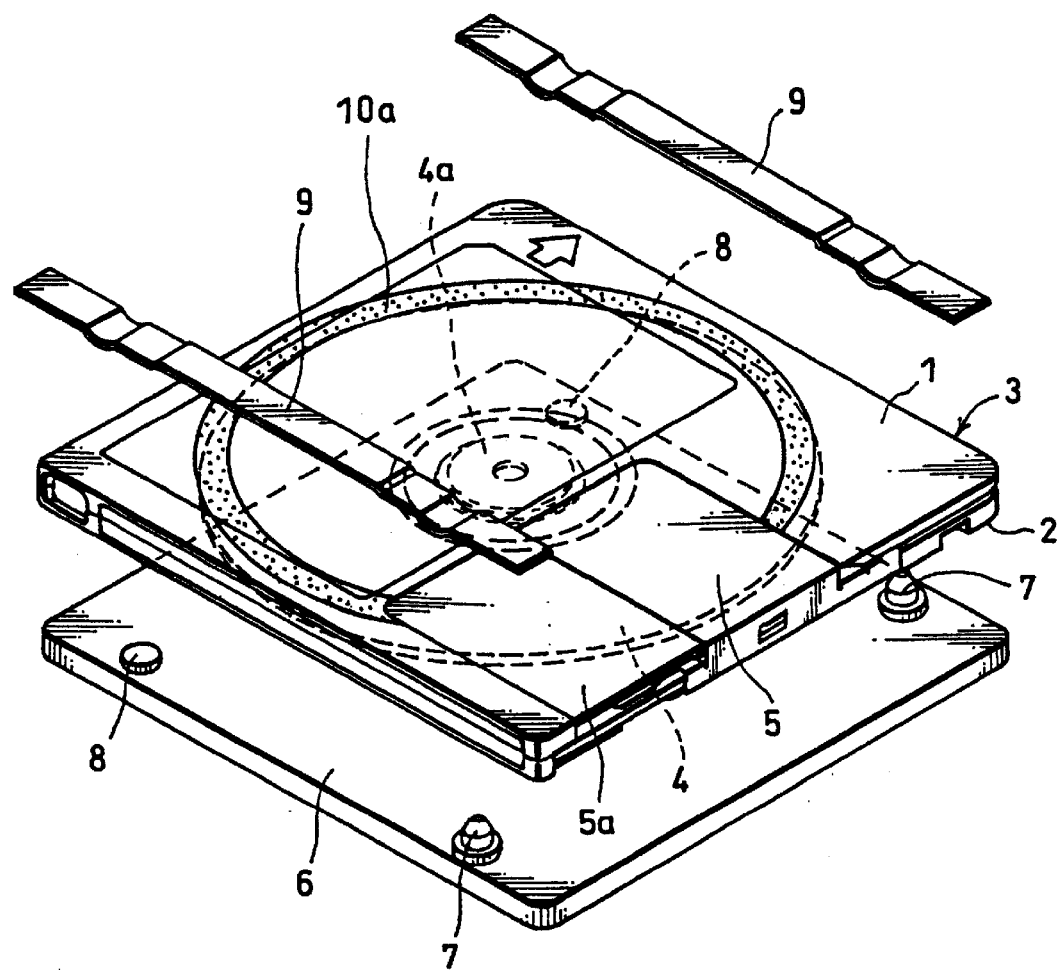
FIG. 9 is a perspective view showing a separated condition of a disc cartridge, a deck and a press-spring based on a second embodiment according to the present invention.

FIG. 9 is a perspective view showing a disc cartridge, a reference table of a deck side and a press-spring supporting an upper half in the mutually separated condition, and a description will be omitted by attaching the same signs to constituting components similar to those in the first embodiment shown in FIG. 1.

Now, in the case of the disc cartridge of the present example, the vibration isolating ink layer 10a is printed on the surface of the outer peripheral part of the upper half 1 in a circle state with about 5 mm in width. In describing in more detail, the vibration isolating ink layer 10a is printed on the portion of the shutter 5 and the portion excepting an area 5a when the shutter 5 is opened.

Figure 10:
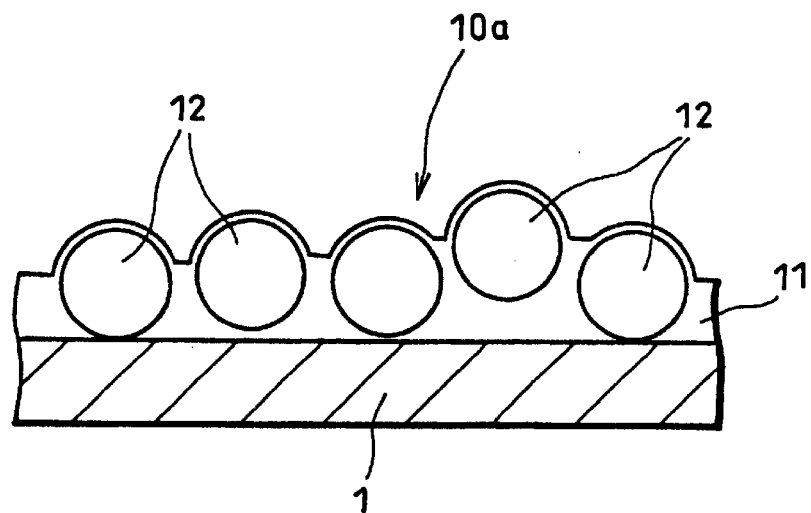
FIG. 10 is similarly, an enlarged view showing a printed condition of the vibration isolating ink layer.

The ink component for the vibration isolating ink layer 10a is the same as the ink component for vibration isolating ink layer 10 described in the first embodiment, and thus, FIG. 10 shows an enlarged figure of the vibration isolating ink layer 10a in a printed state.

According to the present invention, by printing the vibration isolating ink layer 10a in the circle state on the outer peripheral surface of the upper half 1, the vibration transmitted from the deck side and the press-spring 9 to the cartridge housing 3 by the projecting and depressing acrylic particles 12 on the ink layer surface, namely, the vibration displacement beginning to be transmitted to the outer peripheral surface of the cartridge housing 3, can be effectively reduced by the vibration isolating ink layer 10a. The mechanism of reducing the vibration is as follows; namely, when the vibration is transmitted to the vibration isolating ink layer 10a, then the acrylic particles 12 vibrate, and the vibration energy is converted to thermal energy, and thus the vibration is reduced. Accordingly, since the vibration beginning to be transmitted to the outer peripheral surface of the cartridge housing 3 is reduced by the vibration isolating ink layer 10a, the spreading of the vibration toward the central portion of the cartridge housing 3 can be also reduced. As a result, the face vibration of the disc 4 can be suppressed to the minimum. Namely, the reading of signals by the optical head of the disc can be certainly performed, and for example, the reproducing waves of musical signals and the like can be reproduced with fidelity.

Also, since the vibration preventing ink layer 10a printed on the upper half 1 can obtain high hardness as well as high adhesion, when the upper half 1 and the lower half 2 are subjected to ultrasonic-welding, it never peels off or is damaged.

Now, the inventor of the present invention has proved by experiment that the vibration being transmitted to the cartridge housing 3 can be reduced by printing the vibration isolating ink layer 10a in the circle state on the upper half 1.

Figure 11:
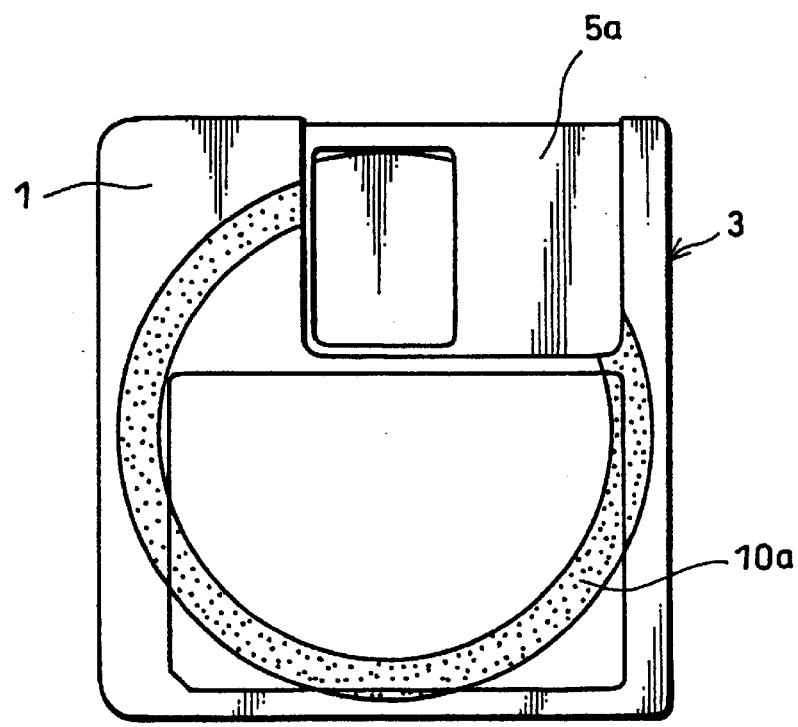
FIG. 11 is similarly, a plan view showing the disc cartridge in a case of the vibration isolating ink layer being printed on an outer peripheral surface of the upper half.
Figure 12:
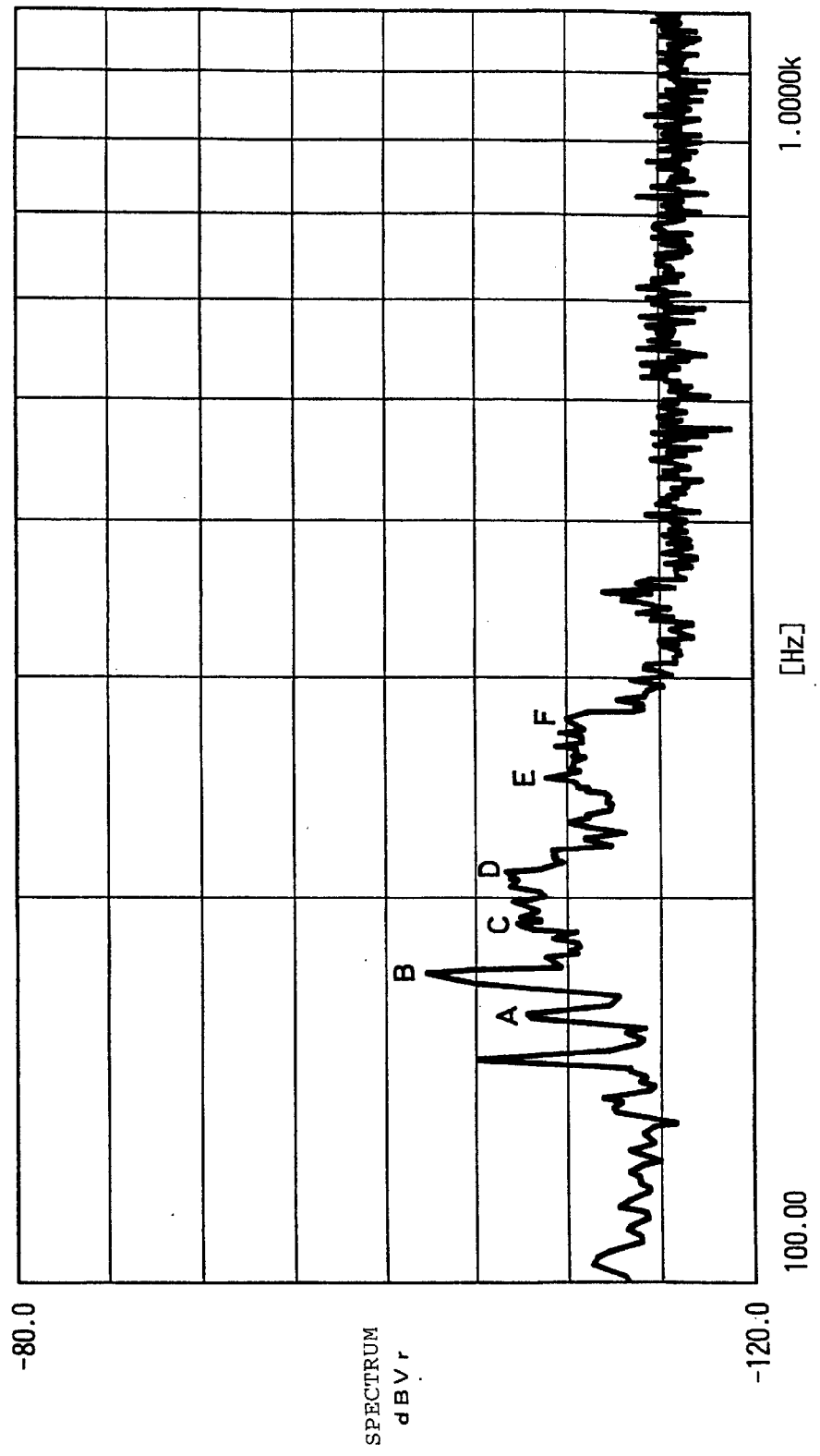
FIG. 12 is analysis data on the vibration generated in the conventional cartridge housing.
Figure 13:
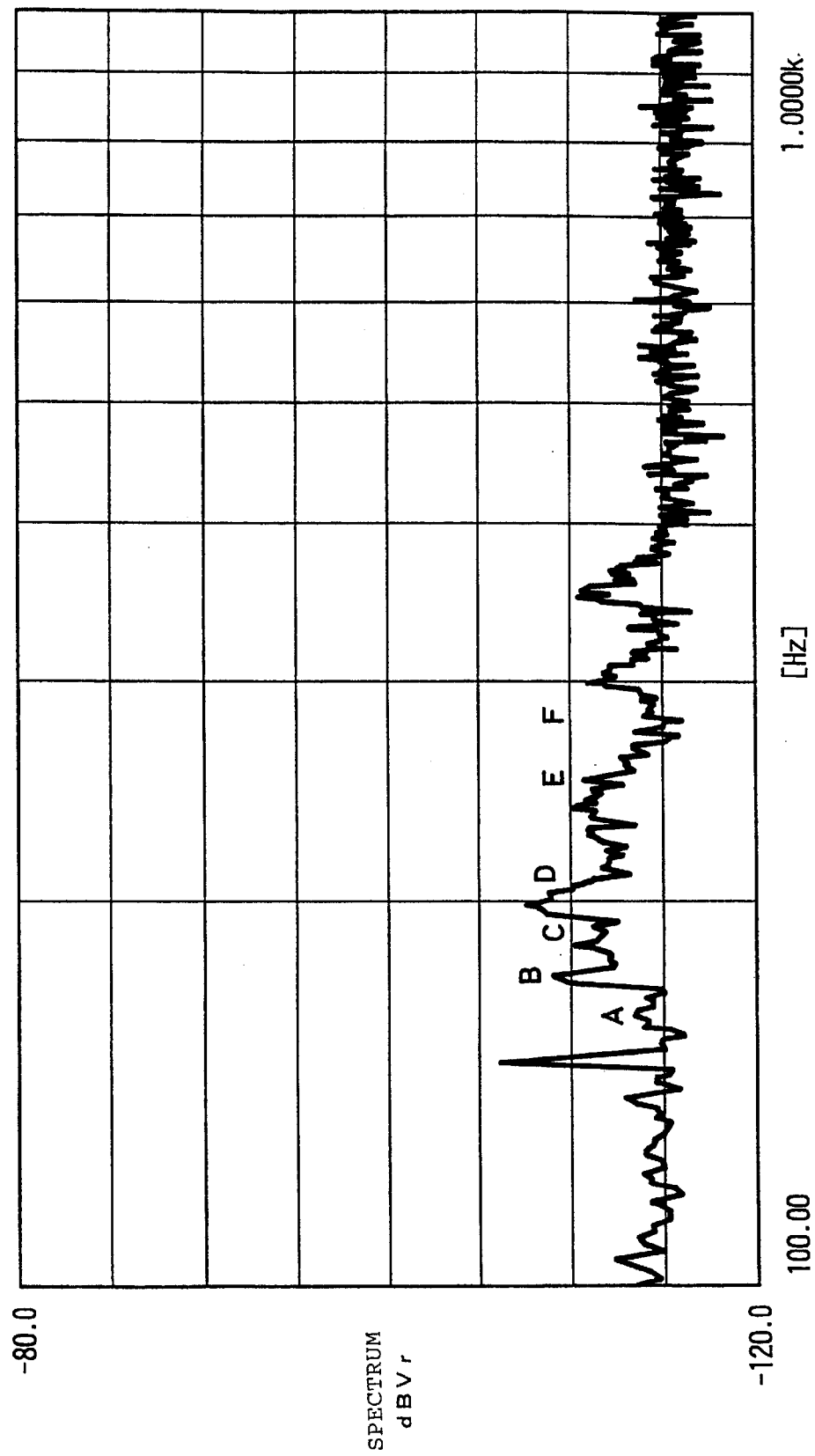
FIG. 13 is analysis data on the vibration generated in the cartridge housing according to the present invention.

As for the experiment method, by using a laser Doppler vibrometer, analysis data by a spectrum analyzer on measurements of the vibrations at the central portion of the upper half 1 in the cases of a conventional cartridge as well as a cartridge where the vibration preventing ink layer 10a is printed in the circle state on the outer peripheral surface of the upper half 1 as in FIG. 11 when an MD disc cartridge is being reproduced are respectively shown in FIG. 12 and FIG. 13. Also, numerical values (dBVr) (numerical values respectively at peak points of A, B, C, D, E, F in FIG. 12 and FIG. 13) relative to several representative frequencies at this time are shown in table 4.

TABLE 4

| Representative frequencies | 162.5 Hz | 175 Hz | 191 Hz | 210 Hz | 250 Hz | 278.5 Hz |
|---|---|---|---|---|---|---|
| Conventional cartridge | −107.59 | −102.28 | −107.19 | −106.54 | −108.77 | −109.93 |
| Ink was printed | −113.37 | −109.04 | −111.13 | −113.31 | −110.69 | −115.13 |

And thus, it is apparent from the result of the experiment that the cartridge housing of the present invention as compared with the conventional cartridge housing has its vibration alleviated and this fact has been made clear from the result of the experiment.

Figure 14:
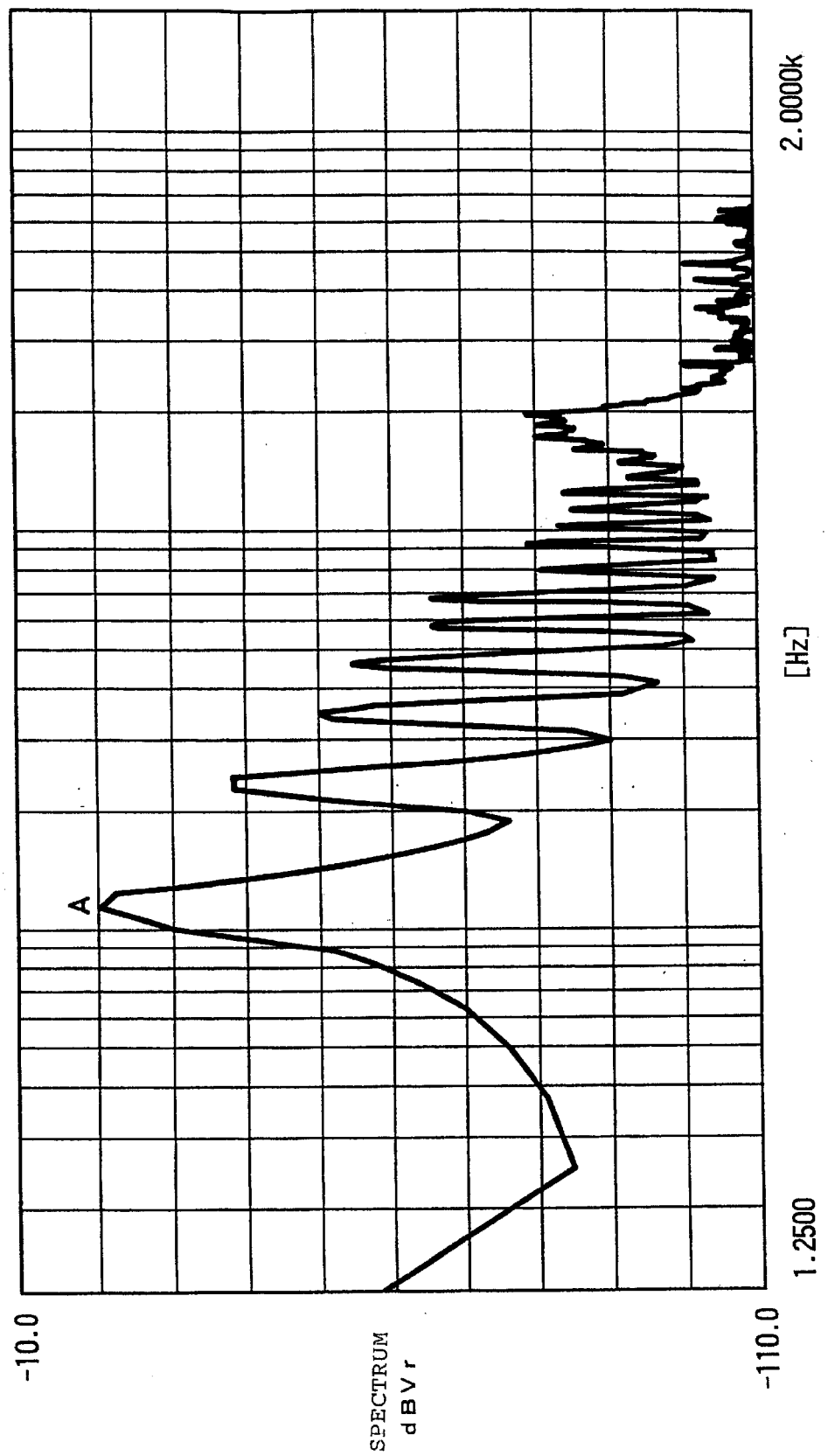
FIG. 14 is analysis data on the vibration of the disc in the conventional cartridge housing.
Figure 15:
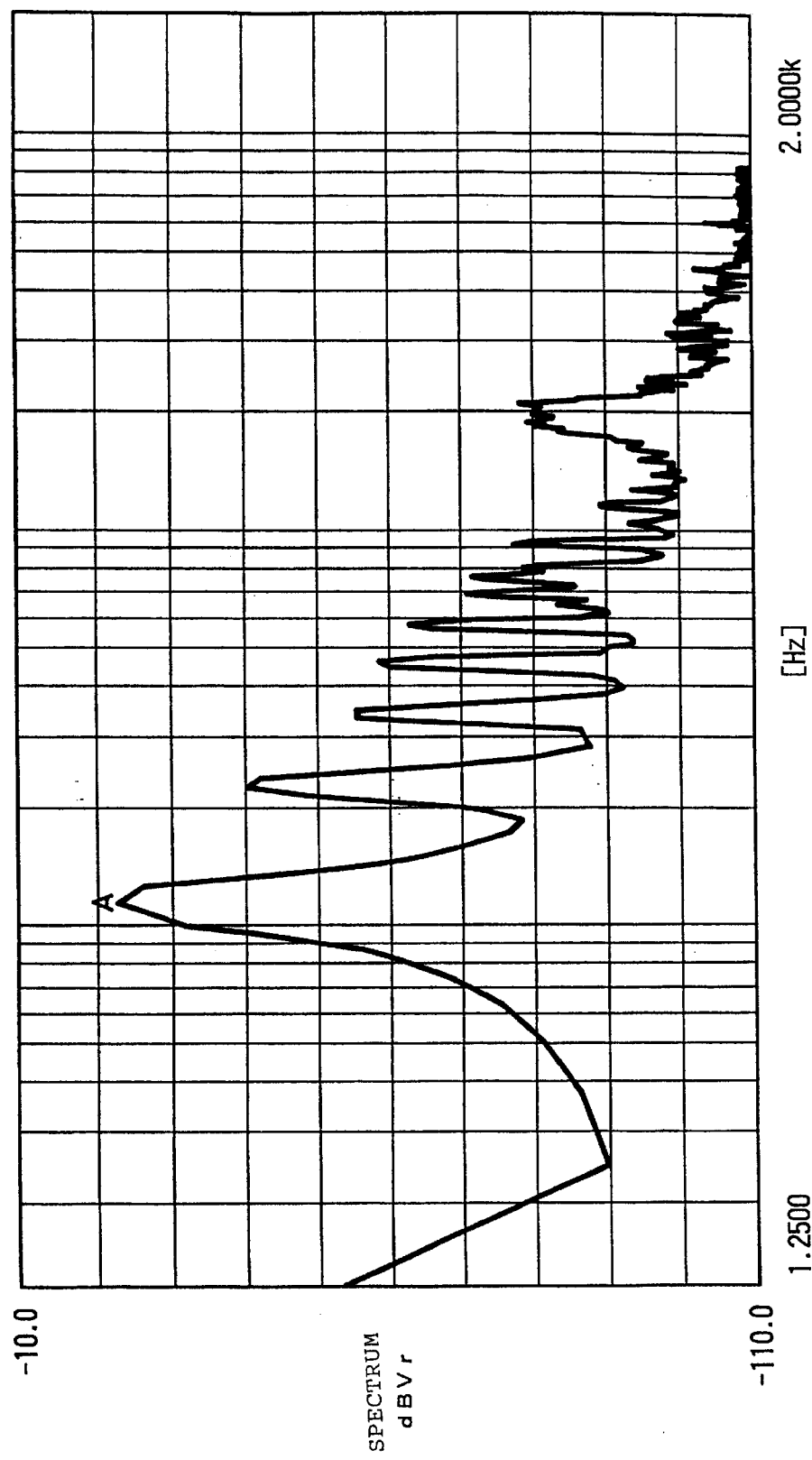
FIG. 15 is analysis data on the vibration of the disc in the cartridge housing according to the present invention.

Also, analysis data by a spectrum analyzer on measurements of the vibrations of a disc in the conventional disc cartridge as well as of a disc in the disc cartridge of the present invention in which the vibrations preventing ink layer 10a is printed in the circle state on the outer peripheral surface of the upper half 1 as shown in FIG. 11 by a measuring method using the above-mentioned same laser Doppler vibrometer, are shown in FIG. 14 and FIG. 15. Meanwhile, numerical values (dBvr) (numerical value at a peak point A in FIG. 14 and FIG. 15) relative to the representative frequency (11.25 Hz) are shown in the table 5.

TABLE 5

| Typical frequencies | 11.25 Hz |
|---|---|
| Conventional cartridge | −20.23 |
| Ink was printed | −22.91 |

In this manner, it is apparent from the result of the experiment that the vibrations of the disc is alleviated when the cartridge housing of the present invention is used instead of the conventional cartridge housing.

Also, the reproducing waveforms of the disc were measured by using the spectrum analyzer. As a measuring method, a digital recording is carried out from a CD player to a deck and reproduction is inputted in the spectrum analyzer and then, a reproduction level is ascertained. Numerical values (dB) of analysis data on disc reproducing waveforms of the conventional disc cartridge as well as of the disc cartridge of the present invention, in which the vibration isolating ink layer 10a is printed in the circle state on the outer peripheral surface of the upper half 1 as shown in FIG. 9 when the representative frequency is 12.75 KHz will be shown in the Table 6. Meanwhile, in order to improve a characteristic of a high-pitched tone of the disc, a high frequency range on the high-pitched tone side is selected. That is the reason why the representative frequency is made 12.7 KHz.

TABLE 6

| | |
|---|---|
| Representative frequency | 12.75 KHz |
| Reproduced waveform | −44.75 |
| Conventional cartridge | −47.21 |
| Ink was printed | −46.13 |

In this manner, it is apparent from the result of the experiment that the reproducing waveform is improved even in the case in which the cartridge housing of the present invention is used in stead of the conventional cartridge housing.

In the embodiment described above, the description was made of the case in which the vibration isolating ink layer 10a was printed in the circle state on the outer peripheral surface of the upper half 1, but even if the vibration isolating ink layer is printed in the circle state on the outer peripheral reverse surface of the upper half 1, the vibration transmitted to the cartridge housing 3 can also be reduced.

Figure 16:
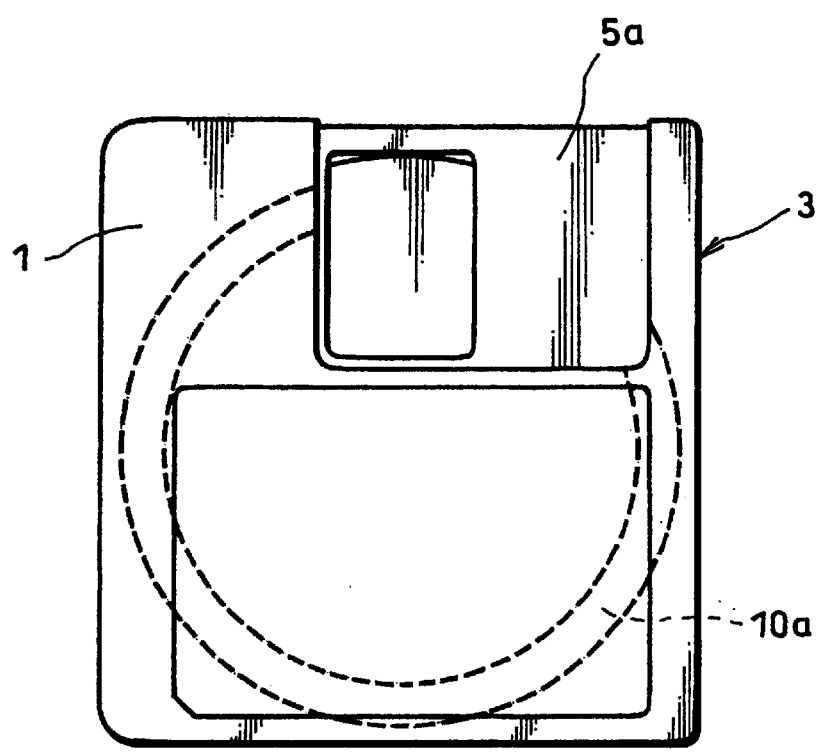
FIG. 16 is a plan view showing the disc cartridge in a case of the vibration isolating ink layer being printed on a reverse surface of the upper half.

The ingredients of the vibration isolating ink are the same ones as in the case mentioned above, and as shown in FIG. 16, the vibration isolating ink layer 10a is printed in the circle state on the outer peripheral reverse surface of the upper half 1. And also, in the case that the vibration isolating ink layer 10a is printed on the reverse surface of the upper half 1, the thickness of the vibration isolating ink layer a is made about 20 μm so that the space in the cartridge using 3 can be sufficiently ensured.

As for the method of the experiment, by using the Laser Doppler vibration meter as in the case mentioned above, measurements of vibrations at the central part of the upper half 1 are performed, when the MD disc cartridge is in a state of being reproduced, in the case of the conventional upper half 1, in the case of the vibration isolating layer being printed on the peripheral front surface of the upper half 1 and on the peripheral reverse surface of the upper half 1, and Table 7 shows some numerical values (dBVr) of the plural peak points relative to several representative frequencies based on the data measured by the spectrum analyzer.

TABLE 7

| Representative frequencies | 162.5 Hz | 176 Hz | 191 Hz | 210 Hz | 250 Hz | 278.5 Hz |
|---|---|---|---|---|---|---|
| Conventional cartridge | −107.59 | −102.28 | −107.19 | −106.54 | −108.77 | −109.93 |
| Printing ink on the front surface | −113.37 | −109.04 | −111.13 | −113.31 | −110.69 | −115.13 |
| Printing ink on the reverse surface | −110.54 | −108.04 | −107.56 | −107.64 | −109.45 | −113.26 |

According to this, although the vibration reducing effect is smaller in the case of the vibration isolating ink layer 10a being printed on the outer peripheral reverse surface of the upper half 1 than in the case of the vibration isolating ink layer 10a is printed on the outer peripheral front surface of the upper half 1, there is an apparent difference when compared with the conventional cartridge, and from the result of the experiment, it has become clear that the vibration was reduced by printing the vibration isolating ink layer 10a on the outer peripheral reverse surface of the upper half 1.

And also, by the measuring method using the Laser Doppler vibration meter as in the case mentioned above, measurements of vibrations at the central part of the upper half 1 are performed, when the MD disc cartridge is in a state of being reproduced, in the case of the conventional upper half 1, in the case of the vibration isolating layer 10a being printed on the peripheral front surface of the upper half 1 and on the peripheral reverse surface of the upper half 1. Table 8 shows a numeral value (dBVr) relative to a representative frequency (11.25 KHz) based on the data measured by the spectrum analyzer.

TABLE 8

| | |
|---|---|
| Representative frequency | 11.25 Hz |
| Conventional cartridge | −20.23 |
| Printing ink on the front surface | −22.91 |
| Printing ink on the reverse surface | −21.78 |

And thus, it is apparent from the result of the experiment that the vibration of the disc was reduced in both cases, when the cartridge housing of the present invention was used instead of the conventional cartridge housing, wherein the vibration isolating layer was printed on the peripheral front surface of the upper half 1 while the vibration isolating layer was printed on the peripheral reverse surface of the upper half 1.

Also, in the Table 9 are shown the numerical values (dB) of the analysis data on disc reproduced signals when the measurements of the vibration at the central part of the upper half 1 are performed in the case of the conventional disc cartridge, in the case of the vibration isolating layer 10a being printed on the peripheral front surface or on the peripheral reverse surface at a time of the representative frequency being 12.7 KHz.

TABLE 9

| | |
|---|---|
| Representative frequency | 12.7 Hz |
| Reproduced waveform | −45.75 |
| Conventional cartridge | −47.24 |
| Printing ink on the front surface | −46.13 |
| Printing ink on the reverse surface | −46.86 |

And thus, it is apparent from the result of the experiment that when the cartridge housing of the present invention was used instead of the conventional cartridge housing, the reproduced waveform of the disc was reduced in the cases wherein the vibration isolating layer was printed on the peripheral front surface of the upper half 1 and when the vibration isolating layer was printed on the peripheral reverse surface of the upper half 1.

Besides, by forming the vibration isolating ink layer 10a also on the lower half 2 in addition to the upper half 1, or by forming the ink layer on either side of the front surface and the reverse surface or on both of the surfaces of both the upper and lower halves 1, 2, the suppression action against the vibration of the cartridge housing can be further improved.

The present invention is not limited to the embodiments described above as well as shown in the drawings, and various kinds of modifications can be effected therein without departing from the gist of the present invention.

For example, according to the embodiment, the description has been made about the MD disc cartridge having a recording and/or reproducing layer on either surface of the disc, but besides this disc cartridge, the present invention can be widely applied to cartridge type optical discs such as a hard disc, a floppy disc and the like or disc cartridges such as a magneto-optical disc and the like. Further, the present invention can be applied to a disc cartridge having recording and/or reproducing layers on both of the surfaces, too.

And other than the disc cartridge, in the case of a cassette in which the magnetic tape is accommodated as a recording medium, by printing the vibration isolating layer on the cassette housing, the vibration of the cassette housing can be reduced and reproduction therefrom can be performed with fidelity.

What is claimed is:

1. A recording medium cartridge, wherein one surface side of a cartridge housing including an upper half and a lower half for accommodating a disc recording medium is disposed on a supporting part of a reference table of a recording and reproducing apparatus and wherein another surface side of the cartridge housing is held by a holding part of the recording and reproducing apparatus, said recording cartridge comprising:

a vibration isolating ink layer containing resin system particles and having surface projections and depressions printed on the another surface side of the cartridge housing held by the holding part at a location opposed to an outer peripheral part including a circumference of the disc recording medium in the cartridge housing.

2. The recording medium cartridge according to claim 1, wherein, the vibration isolating ink layer is printed in a circle state on the outer peripheral part of the upper half surface of the cartridge housing.

3. The recording medium cartridge according to claim 1, wherein, the vibration isolating ink layer is printed on a front surface and on a reverse surface of the upper half of the cartridge housing.

4. The recording medium cartridge according to claim 1, wherein, the ratio of the vibration isolating ink layer being printed on the upper half of the cartridge housing containing the support area to the upper half of the cartridge housing is 50% or greater.

5. The recording medium cartridge according to claim 1, wherein, the vibration isolating ink layer is formed by silk printing.

* * * * *